(12) United States Patent
Ruppel et al.

(10) Patent No.: US 8,485,164 B2
(45) Date of Patent: Jul. 16, 2013

(54) OIL MIST SEPARATOR

(75) Inventors: Stefan Ruppel, Heidelberg Emmertsgrund (DE); Nic Sautter, Plochingen (DE); Leszek Goerlich, Leonberg (DE); Ulrich Hütter, Schorndorf (DE); Yakup Özkaya, Kornwestheim (DE)

(73) Assignee: Mahle International GmbH (DE)

( * ) Notice: Subject to any disclaimer, the term of this patent is extended or adjusted under 35 U.S.C. 154(b) by 385 days.

(21) Appl. No.: 12/809,360

(22) PCT Filed: Dec. 19, 2008

(86) PCT No.: PCT/EP2008/068003
§ 371 (c)(1),
(2), (4) Date: Jun. 18, 2010

(87) PCT Pub. No.: WO2009/080747
PCT Pub. Date: Jul. 2, 2009

(65) Prior Publication Data
US 2010/0307466 A1    Dec. 9, 2010

(30) Foreign Application Priority Data
Dec. 21, 2007  (DE) .......................... 10 2007 062 098

(51) Int. Cl.
*F02B 25/06*    (2006.01)
(52) U.S. Cl.
USPC .......................... 123/572; 123/573; 123/574
(58) Field of Classification Search
USPC ................................. 123/572–574
See application file for complete search history.

(56) References Cited

U.S. PATENT DOCUMENTS

| 4,721,090 A |   | 1/1988  | Kato |
|---|---|---|---|
| 4,993,375 A | * | 2/1991  | Akihiko ...................... 123/90.38 |
| 5,129,858 A | * | 7/1992  | Komori et al. ................. 454/155 |
| 5,429,101 A | * | 7/1995  | Uebelhoer et al. ............. 123/572 |
| 5,562,087 A | * | 10/1996 | Wright ........................... 123/572 |
| 5,669,366 A |   | 9/1997  | Beach et al. |
| 6,290,738 B1 |   | 9/2001  | Holm |

(Continued)

FOREIGN PATENT DOCUMENTS

| CN | 102317585 A | 1/2012 |
|---|---|---|
| DE | 3618557 A1 | 12/1986 |

(Continued)

OTHER PUBLICATIONS

Office Action from corresponding CN patent application No. 200880121886.8 dated Mar. 1, 2012 with English translation.

(Continued)

*Primary Examiner* — Maguerite McMahon
*Assistant Examiner* — James Kim
(74) *Attorney, Agent, or Firm* — Rader, Fishman & Grauer PLLC

(57) ABSTRACT

A crankcase ventilation oil mist separator system, comprising: a first separator unit, which has at least one filter body arranged in a blow-by gas path such that blow-by gas flows through the body; a second separator unit which is arranged in a bypass path that bypasses the first separator unit; and a bypass valve which opens the bypass path when a differential pressure in the first separator unit exceeds a predefined value, wherein the second separator unit is an impactor separator.

16 Claims, 2 Drawing Sheets

U.S. PATENT DOCUMENTS

| | | | |
|---|---|---|---|
| 6,478,018 B2 * | 11/2002 | Fedorowicz et al. | 123/572 |
| 6,505,615 B2 | 1/2003 | Pietschner | |
| 6,601,385 B2 * | 8/2003 | Verdegan et al. | 60/286 |
| 6,684,864 B1 * | 2/2004 | Busen et al. | 123/572 |
| 6,797,040 B2 * | 9/2004 | Lenzing | 95/267 |
| 7,025,049 B2 * | 4/2006 | Pietschner | 123/572 |
| 2004/0261775 A1 * | 12/2004 | Mashiko | 123/572 |
| 2005/0061305 A1 * | 3/2005 | Pietschner | 123/572 |
| 2007/0151215 A1 * | 7/2007 | Knittel et al. | 55/345 |
| 2007/0215128 A1 * | 9/2007 | Yonebayashi et al. | 123/572 |
| 2008/0047519 A1 * | 2/2008 | Naito et al. | 123/193.5 |
| 2008/0105494 A1 | 5/2008 | Lemke et al. | |
| 2010/0229510 A1 | 9/2010 | Heinen et al. | |

FOREIGN PATENT DOCUMENTS

| | | |
|---|---|---|
| DE | 19729439 A1 | 1/1998 |
| DE | 10232044 A1 | 2/2004 |
| DE | 20302220 U1 | 6/2004 |
| DE | 10359523 A1 | 7/2005 |
| DE | 102004055065 A1 | 5/2006 |
| DE | 102004061938 B3 | 6/2006 |
| DE | 102005038257 A1 | 2/2007 |
| DE | 102006051143 A1 | 5/2008 |
| EP | 0860589 A1 | 8/1998 |
| EP | 1275828 A2 | 1/2003 |
| EP | 1359293 A1 | 11/2003 |
| JP | 61159611 A | 10/1986 |
| JP | 9-112358 A | 4/1997 |
| JP | 10-115212 A | 5/1998 |
| JP | 2001-054711 A | 2/2001 |
| JP | 2003-535252 A | 11/2003 |
| JP | 2005201080 A | 7/2005 |
| WO | WO-01/92690 A1 | 12/2001 |
| WO | WO-2009025927 A1 | 2/2009 |

OTHER PUBLICATIONS

German Search Report for DE08865798.6, Dated Jan. 10 2011.
English abstract for JP9-112358, Dated Apr. 28, 1997.
English translation of JP Office Action for JP2010-538754, Dated Jul. 26, 2012.
International Search Report, Dated Jul. 2, 2009.
English abstract provided for JP-2005201080, Dated Jan. 13, 2004.
English abstract for DE-102004055065, Dated May 18, 2006.
English abstract for DE-102004061938, Dated Jun. 29, 2008.
English abstract for DE-10232044, Dated Feb. 5, 2004.
English abstract for DE-10359523, Dated Jul. 14, 2005.
English abstract for DE-20302220, Dated Jun. 24, 2004.

* cited by examiner

OIL MIST SEPARATOR

CROSS-REFERENCES TO RELATED APPLICATIONS

This application claims priority to German patent applications DE 10 2007 062 098.7 filed on Dec. 21, 2007, and PCT/EP2008/068003 filed on Dec. 19, 2008, both of which are hereby incorporated by reference in their entirety.

TECHNICAL FIELD

The present invention relates to an oil mist separator for a positive crankcase ventilation unit.

BACKGROUND

During the operation of internal combustion engines which, for example, can be arranged in motor vehicles, so-called blow gas gets through a leakage between pistons and cylinders into a crankcase of the respective internal combustion engine. To prevent unacceptable overpressure within the crankcase or to prevent emission of blow-by gas into the environment, positive crankcase ventilation systems are used. Usually, such a positive ventilation system connects the crankcase by means of a vent line with a fresh gas tract of an internal combustion engine. Within the fresh gas tract, in particular downstream of a throttle valve, a relative negative pressure exists which allows that blow-by gas is sucked-in from the crankcase. Further, during the operation of the internal combustion engine, oil mist is generated. Thus, exhausted blow-by gas contains oil mist. To reduce the oil consumption of the internal combustion engine or to reduce the pollutant emission of the internal combustion engine, the positive crankcase ventilation system normally has an oil mist separator that serves for separating the oil mist carried along in the blow-by gas sucked out of the crankcase and to convey it to a suitable oil reservoir which, in particular, can involve an oil pan attached at the bottom of the crankcase.

SUMMARY

A progressively tightening of pollutant emission regulations requires an improvement of the cleaning effect of such oil mist separators. Additional, partially conflicting requirements must be met such as, e.g., the longest possible maintenance-free service life of the oil mist separator, a pressure loss as small as possible, a design as compact as possible, and a separation efficiency as high as possible.

From EP 0 860 589 B1, an oil mist separator for a crankcase ventilation system is known which has a first separator unit and a second separator unit as well as a bypass valve. The first separator unit comprises at least one filter body that is arranged in a blow-by gas path in such a manner that blow-by gas can flow through it. The second separator unit is arranged in a bypass path which bypasses the first separator unit and which is opened by the bypass valve as soon as a differential pressure at the first separator unit exceeds a predefined value. In the known oil mist separator, the second separator unit is formed by a filter body.

Further oil mist separators which have a bypass path controlled by means of a bypass valve and directed to the environment of their separator unit, but which do not have an additional separator unit arranged within the bypass path are known from DE 10 2006 051 143 A1, from DE 10 2005 038 257 A1, from DE 2004 061 938 B3, from DE 10 2004 055 065 A1, from DE 103 59 523 A1, from DE 102 32 044 A1, from DE 197 29 439 A1, from WO 01/92 690 A1, and from DE 203 02 220 U1.

The present invention is concerned with the problem to provide, for an oil mist separator of the above mentioned type, an improved embodiment which is in particular characterized in that it can be manufactured in a comparatively inexpensive manner and preferably has a compact design with a comparatively long maintenance-free service life, and in that it offers an acceptable pressure loss and achieves a relatively high separation efficiency.

This problem is solved according to the invention by the subject matters of the independent claims. Advantageous embodiments are subject matter of the dependant claims.

In the invention, the second separator unit is designed as an impactor separator. This is a special type of an inertial separator that normally works with an impact wall or impact plate against which the blow-by gas flow is directed by means of suitable flow guiding means to achieve a deflection of the flow. While the gas, due to an impulse reversion, simply bounces off the impact plate and flows off in more or less opposite direction, liquid particles adhere to the impact wall, can accumulate thereon and can flow off. With a suitable flow velocity during the impact on the impact plate, such an impactor separator can also achieve advantageous separating efficiencies similar to the ones of a filter body. With such an impactor separator, the risk of backpressure increase caused by gradual clogging does normally not occur. To achieve the desired high separation efficiency, however, the impactor separator needs a comparatively high flow velocity which can normally be achieved by means of a cross-section reduction, in particular by means of a nozzle formation which, however, results in a corresponding backpressure increase. Thus, in case of low differential pressures, such an impactor separator does not work at all or only insufficiently. In contrast thereto, in the oil mist separator according to the invention, the impactor separator, thus the second separator unit is only used when appropriately high differential pressures already exist. In this manner, the embodiment of this oil mist separator combines the advantages of the two different separator principles resulting in an increased overall efficiency of the oil mist separator. While the first separator unit working with the filter body allows for high separation efficiency at a low volume flow of blow-by gases, the second separator unit designed as an impactor separator can achieve high separation efficiency also at high volume flows.

Here, the invention is based on the general idea to equip the oil mist separator with at least two parallelly arranged separator units, one of which has a filter body through which blow-by gas can flow and the second one of which can be activated or connected pressure-dependent by means of a bypass valve. The filter body through which blow-by gas can flow is characterized by very high separation efficiency because it can be readily designed in such a manner that it is permeable for a gas flow, whereas it is quasi impermeable for solid or liquid particles up to very small core diameters which are carried along. In comparison to inertial separators which remove oil droplets and solid particles from the blow-by gas flow only by a flow deflection, such a filter body also collects smaller or lighter oil droplets and solid particles. However, filter bodies have an increased higher flow resistance, at least with respect to simple inertial separators. The trough-flow resistance of such a filter body increases with increasing loading of the respective filter material. Separated solid particles are deposited in the filter material. Separated liquid droplets can accumulate first in the filter material and can flow off again from the filter material upon sufficient wetting.

Here, it is also possible to a achieve a drop formation on the flow-off side, wherein the drops which are formed flow off or drip off after reaching a certain size. Thus, the through-flow resistance of the filter body can increase during the operation of the oil mist separator. To prevent, at the filter body, an inadmissibly high through-flow resistance which would jeopardize a required blow-by gas suction from the crankcase, the bypass valve is provided which, when a predefined differential pressure at the first separator unit is reached, opens a bypass in which the second separator unit is arranged. Through its arrangement within the bypass, this second separator unit is arranged parallelly to the first separator unit. The activated second separator unit hence works in addition to the first separator unit, wherein the distribution of the blow-by gas between the two separator units depends on the differential pressure applied to the first separator unit. The higher the differential pressure, the higher is the amount of blow-by gas flowing through the bypass path and through the second separator unit.

By means of the second separator unit which is connected in parallel and can be activated pressure-dependent, it can be ensured that even in case of a clogged filter body of the first separator unit, or in general, in case of a high differential pressure applied to the oil mist separator, a sufficient amount of blow-by gas can flow through the oil mist separator. Hence, a blow-by gas quantity required for a functionally reliable ventilation of the crankcase can be sucked off at least in the relevant operational regions of the internal combustion engine.

According to a particularly advantageous embodiment, furthermore, a third separator unit can be provided which is arranged upstream of the two separator units. By means of this third separator unit, a pre-separation can be implemented, for example to be able to trap comparatively large oil droplets before they reach the filter body of the first separator unit. Hereby, an early contamination of the filter body can effectively be avoided.

According to an advantageous embodiment, the third separator unit can comprise a nozzle plate. Such a nozzle plate has a plate body containing a plurality of nozzle openings through which a parallel flow can pass and which converge in flow direction. Within the nozzle openings, the blow-by gas flow is accelerated and deflected in direction of the outlet cross-sections of the nozzle openings. Hereby, larger droplets can impinge on the converging walls of the nozzle openings and can discharge to the inflow side of the nozzle plate.

Advantageous is a development in which a third separator unit has a fleece body which is either arranged directly at the outflow side of the nozzle plate or spaced apart therefrom. The oil droplets carried along in the accelerated nozzle flow impinge on the fleece body and can thus be separated.

A further advantageous embodiment is characterized in that the impactor separator has an impact wall which is formed by a valve element of the bypass valve. Hereby, the valve element is given a double function. Conceivable as a valve element is, for example, a pivotably arranged flap.

According to another advantageous embodiment, the impactor separator and the bypass valve can form a structural unit which is pre-assembled and which can be inserted in the pre-assembled state into the oil mist separator. Hereby, the assembly of the oil mist separator is simplified.

Moreover, the oil mist separator can comprise a support frame which is designed for receiving the separator devices and the bypass valve. This too simplifies the assembly of the oil mist separator. Optionally, the support frame can contain further components. For example, a section of the fresh air line can be integrated in the support frame. Further, the support frame can contain a section of the blow-by gas path, which section runs from the first separator device and from the second separator device to the fresh air path. In addition, the support frame can contain a pressure control valve. Furthermore, the support frame can comprise a blow-by gas path inlet, which can be connected in a communicating manner with a crankcase of an internal combustion engine, and can contain a section of the blow-by gas path which section runs from this inlet to the separator units.

Particularly advantageous is an embodiment in which the support frame is designed as a cylinder head cover of a cylinder head of an internal combustion engine. Thereby, the support frame forms a highly integrated unit which can be mounted in a space-saving manner.

Further important features and advantages of the invention arise from the sub-claims, from the drawings and the associated description of the Figures based on the drawings.

It is to be understood that the above mentioned features and the features yet to be illustrated hereinafter can be used not only in the respectively mentioned combination but also in any other combination or alone without departing from the scope of the present invention.

BRIEF DESCRIPTION OF THE DRAWING

Preferred exemplary embodiments are illustrated in the drawings and are explained in more detail in the following description, wherein identical reference numbers refer to identical or similar or functionally identical components.

In the Figures.

DETAILED DESCRIPTION

Figure 1:
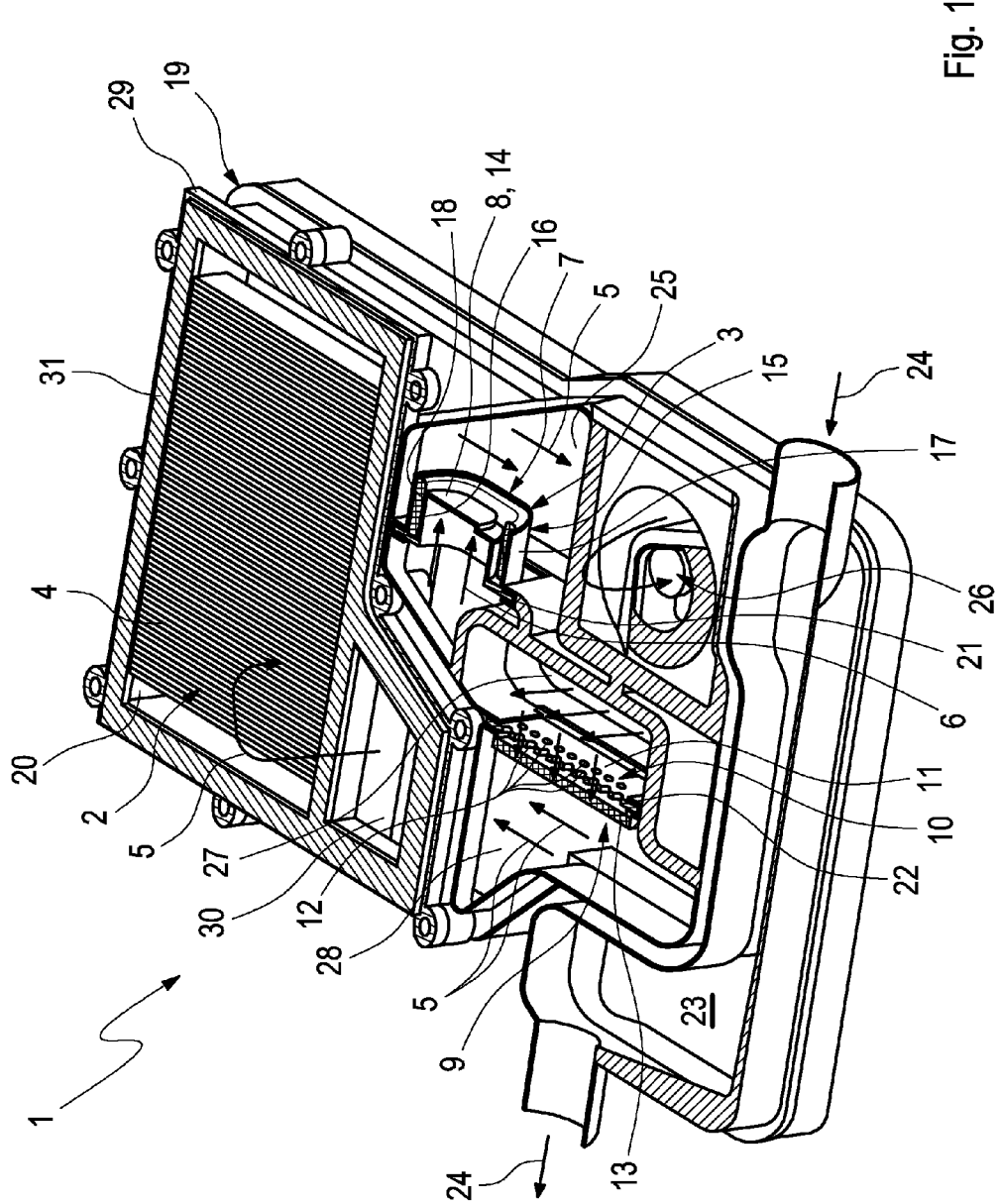
FIG. 1 shows schematically a partial sectional perspective top view of the oil mist separator.
Figure 2:
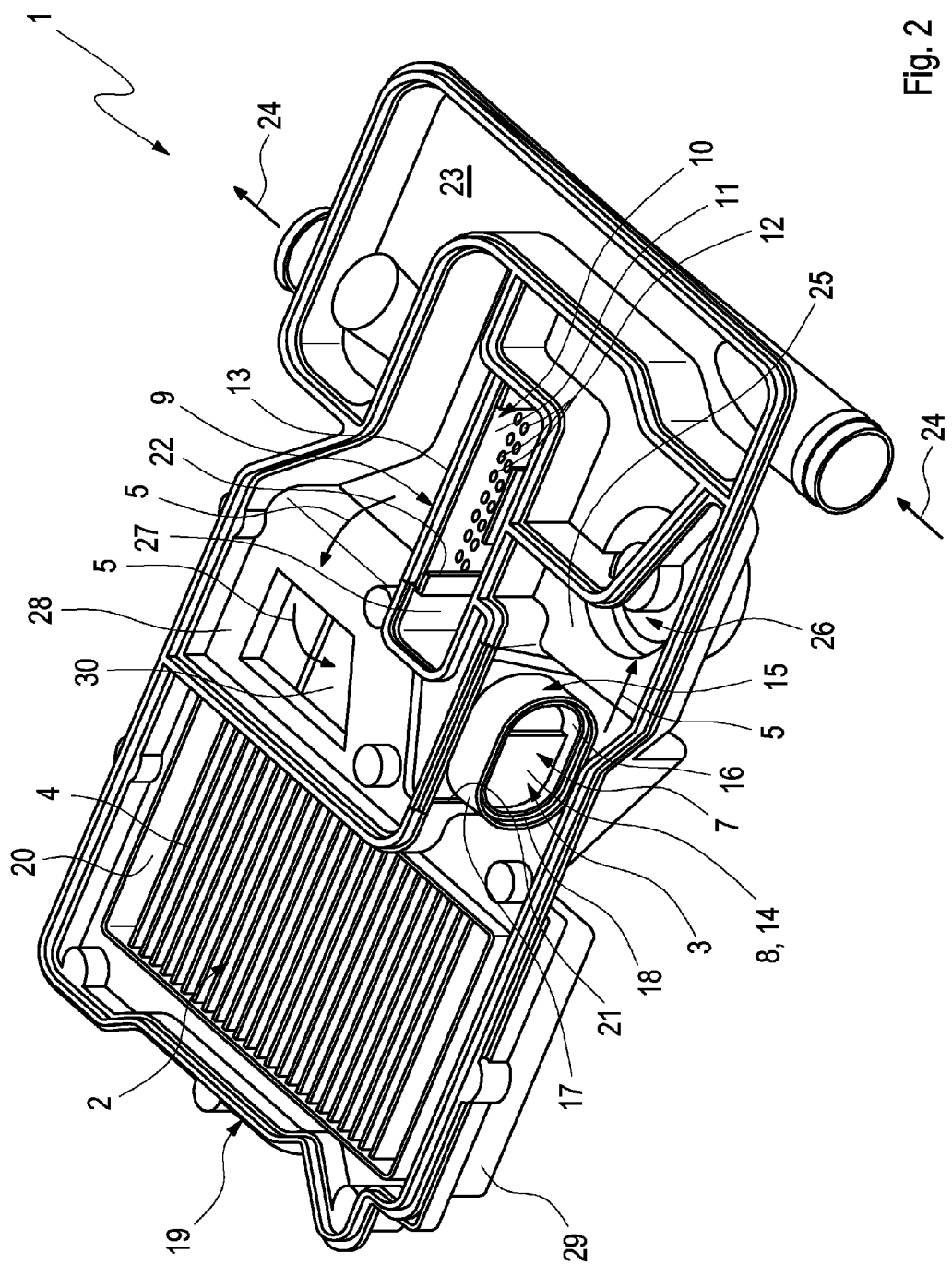
FIG. 2 shows schematically a perspective bottom view of the oil mist separator.

According to FIGS. 1 and 2, an oil mist separator 1 that can be used in a positive crankcase ventilation system for an internal combustion engine comprises a first separator unit 2 and a second separator unit 3. The first separator unit 2 has at least one filter body 4 which, in the example, is designed as a flat bellows-type filter. The filter body 4 is arranged in a blow-by gas path 5 in such a manner that the blow-by gas can flow through it. In contrast, the second separator unit 3 is arranged in a bypass path 6 bypassing the first separator unit 2. The oil mist separator 1 comprises further a bypass valve 7 which is arranged in such a manner that it opens the bypass path 6 when a differential pressure applied to the first separator unit 2 reaches or exceeds a predefined value. The second separator unit 3 is designed as an impactor separator and works accordingly with an impact wall 8 against which the blow-by gas flow is directed such that the particles carried along, in particular oil droplets, impinge on the impact plate 8, accumulate thereon and can flow off.

The oil mist separator 1 introduced herein comprises in addition a third separator unit 9. With respect to the two other separator units 2, 3, the third separator unit is designed as pre-separator and is arranged accordingly upstream of the two other separator units 2, 3. Thus, the third separator 9 is arranged in the blow-by gas path upstream of the separator unit 2 and downstream of a branch-off point at which the bypass path 6 branches off from the blow-by gas path 5.

Said third separator unit 9 can comprise a nozzle plate 10. The same has a plate body 11 which contains a plurality of nozzle openings 12. The nozzle openings 12 penetrate the plate body 11. The flow can pass parallelly through the nozzle openings and they can be formed particularly in such a manner that they converge in flow direction. In the shown embodiment, the third separator unit 9 is additionally equipped with a fleece body 13 which, in the example, is arranged spaced apart from the outflow side of the nozzle plate 10. It is principally also possible to arrange the fleece body 13 directly on the outflow side of the nozzle plate 10. In any case, the fleece body 13 is positioned in such a manner that the blow-by gas flow penetrating through the nozzle openings 12 flows against it and, in particular, through it. The filtering effect of said fleece body 13 is considerably smaller, hence coarser, than the filtering effect of the filter body 4 of the first separator unit 2.

The impact wall 8 of the impactor separator, thus of the second separator unit 3, can be formed by a valve element 14 of the bypass valve 7. In the shown example, the valve element 14 is a flap that can pivot on the edge side about a pivot axis which is not illustrated here and which extends perpendicular with respect to the flow direction of the bypass flow. The flap-like valve element 14 can be biased in its closed position by means of a spring which is not shown here. As soon as the pressure on the inflow side of the valve element 14 reaches the previously mentioned predefined value of the maximum tolerable differential pressure, the correspondingly dimensioned preload force of the spring is overcome so that the valve element 14 can open up. In the subsequently developing blow-by gas flow, the blow-by gas impinges against the valve element 14 thereby serving as impact wall or forming the impact wall 8 of the impactor separator. Liquid droplets which are carried along impinge on the impact wall 8, accumulate thereon and can flow off thereon.

In the shown preferred example, the impactor separator, thus the second separator unit 3, and the bypass valve 7 form a structural unit 15. This unit 15 or assembly 15 can be pre-assembled and can be inserted in the pre-assembled state into the oil mist separator 1. In the example, this unit 15 comprises an inner tube 16 and outer tube 17 which are arranged coaxially to one another.

The valve element 14 or the impact plate 8 is arranged on an outlet side of the inner tube 16. The outer tube 17 encloses the inner tube 16 thereby forming an annular space in which a fleece body 18 is arranged. Further, the outer tube 17 protrudes the inner tube 16 in axial direction, namely on the outlet side. In case of small aperture angles of the flap-like valve element 14, the valve element 14 or the impact wall 8 enforces a flow deflection against the outer tube's 17 inner side facing the inner tube 16. However, on this inner side, the fleece body 18 is arranged. For such small aperture angles, the inner side of the outer tube 17 or the fleece bodies 18 arranged thereon serve also as impact wall. Liquid droplets which are carried along are absorbed by the fleece body 18 and discharged.

The oil mist separator 1 shown here is additionally characterized by a support frame 19. The same is designed in such a manner that it can receive the separator units 2, 3, 9, and the bypass valve 7. For example, the support frame 19 contains a receptacle 20 for the filter body 4 of the first separator unit 2. In the example, the support frame has further a receptacle 21 for the impactor-valve unit 15. In addition, a receptacle 22 is provided here in which the nozzle plate 10 can be inserted.

In the example, a section 23 of a fresh air line indicated by arrows is also integrated in the support frame 19. The support frame 19 is in particular made from plastic by means of injection molding. Said fresh air line section 23 can be integrally formed thereon.

The support frame 19 contains further a section 25 of the blow-by gas path 5, which section runs from the first separator unit 2 and from the second separator unit 3 to the fresh air path. The connection to the fresh air path is advantageously carried out in the fresh air line's 24 section 23 integrated in the support frame 19. In addition, the support frame 19 can contain a pressure control valve 26 by means of which the blow-by gas quantity is controlled. Said pressure control valve 26 controls in particular the communicating connection between the mentioned section 25 of the blow-by gas path 5 and the mentioned section 23 of the fresh air line 24.

In the example, the support frame 19 also has an inlet 27 which, in the assembled state of the oil mist separator 1, is connected in a communicating manner with the crankcase of the respective internal combustion engine. In addition, the support frame 19 contains a section 28 of the blow-by gas path 5, which section runs from the mentioned inlet 27 to the separator units 2, 3, 9.

Overall, the support frame 19 thus represents a highly integrated component which receives a plurality of components of the oil mist separator 1 and which performs complex gas conveying functions.

Furthermore, the support frame 19 can comprise a cover 29. Said cover 29 closes the support frame 19 at least in a region in which the filter body 4 is arranged. With the cover 29 removed, the filter body 4 can thus readily be replaced. In the shown preferred example, in addition, the cover 29 is designed in such a manner that it contains a section 30 of the blow-by gas path 5, which section runs to the first separator unit 2 or to the filter body 4. Thus, also the cover 29 has a double function. For a gas-tight and pressure-tight connection between the cover 29 and the support frame 19, a seal 31 can be provided which, in the example, functions axially and which is axially clamped when screwing on the cover 29.

The support frame 19 is preferably designed as cylinder head cover by means of which the cylinder head of an internal combustion engine can be closed or covered. For the internal combustion engine, this results in an overall particularly compact design. Principally, it is also possible to arrange the support frame 19 within the cylinder head cover as a separate component.

The invention claimed is:

1. A crankcase ventilation oil mist separator system, comprising:
    a first separator unit, which has at least one filter body arranged in a blow-by gas path that blow-by gas flows through the body;
    a second separator unit which is arranged in a bypass path that bypasses the first separator unit; and
    a bypass valve having a valve element which opens the bypass path when a differential pressure in the first separator unit exceeds a predefined value,
    wherein the second separator unit is an impactor separator;
    wherein the impactor separator has an inner tube and an outer tube arranged coaxially thereto;
    wherein the valve element is adjustably arranged on the outlet side of the inner tube for opening the bypass path through the outlet side of the inner tube;
    wherein the impactor separator and the bypass valve form a structural unit, which is pre-assembled and inserted in the pre-assembled state into the oil mist separator;
    wherein the outer tube has a fleece body arranged on an inner side facing the inner tube.

2. The oil mist separator according to claim 1, further comprising a third separator unit arranged in the blow-by gas path upstream of the two other separator units.

3. The oil mist separator according to claim 2, wherein a third separator unit has a nozzle plate, which contains in a plate body a plurality of nozzle openings through which a parallel flow passes and converges in a particular flow direction.

4. The oil mist separator according to claim 3, wherein the third separator unit comprises a fleece body arranged on at least one of the outflow side of the nozzle plate and spaced apart thereto.

5. The oil mist separator according to claim 1, wherein the impactor separator has an impact wall, which is formed by the valve element of the bypass valve and the valve element is a flap that pivots on an edge side and enforces a flow deflection against an inner side of the outer tube facing the inner tube.

6. The oil mist separator according to claim 1, wherein a support frame receives the at least two separator devices and the bypass valve.

7. The oil mist separator according to claim 6, wherein a section of a fresh air line is integrated in the support frame.

8. The oil mist separator according to claim 6, wherein the support frame contains a section of the blow-by gas path, which section runs from the first separator unit and from the second separator unit to the fresh air path.

9. The oil mist separator according to claim 6, wherein the support frame contains a pressure control valve.

10. The oil mist separator according to claim 6, wherein the support frame has a blow-by gas inlet which is connected to the crankcase in a communicating manner and that the support frame contains a section of the blow-by gas path, which section runs from the inlet to the separator units.

11. The oil mist separator according to claim 6, wherein the support frame has a cover, which contains a section of the blow-by gas path, which section runs to the first separator unit.

12. The oil mist separator according to claim 6, wherein the support frame is a cylinder head cover of a cylinder head of an internal combustion engine.

13. The oil mist separator according to claim 2, wherein the impactor separator has an impact wall, which is formed by the valve element of the bypass valve.

14. The oil mist separator according to claim 3, wherein the impactor separator has an impact wall, which is formed by the valve element of the bypass valve.

15. The oil mist separator according to claim 4, wherein the impactor separator has an impact wall, which is formed by the valve element of the bypass valve.

16. A crankcase ventilation oil mist separator system, comprising:
    a first separator unit, which has at least one filter body arranged in a blow-by gas path that blow-by gas flows through the body;
    a second separator unit which is arranged in a bypass path that bypasses the first separator unit; and
    a bypass valve having a valve element which opens the bypass path when a differential pressure in the first separator unit exceeds a predefined value,
    wherein the second separator unit is an impactor separator;
    wherein the impactor separator has an inner tube and an outer tube arranged coaxially thereto;
    wherein the valve element is adjustably arranged on the outlet side of the inner tube for opening the bypass path through the outlet side of the inner tube;
    wherein the impactor separator has an impact wall, which is formed by the valve element of the bypass valve and the valve element is a flap that pivots on an edge side and enforces a flow deflection against an inner side of the outer tube facing the inner tube.

\* \* \* \* \*